(12) United States Patent
Saito

(10) Patent No.: US 7,552,964 B2
(45) Date of Patent: Jun. 30, 2009

(54) FRONT WINDSHIELD SUPPORT STRUCTURE OF A VEHICLE

(75) Inventor: Yoji Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/038,281

(22) Filed: Feb. 27, 2008

(65) Prior Publication Data

US 2008/0211255 A1  Sep. 4, 2008

(30) Foreign Application Priority Data

Mar. 2, 2007  (JP) ............................. 2007-052414

(51) Int. Cl.
*B62D 25/08* (2006.01)
(52) U.S. Cl. ............... 296/192; 296/187.04; 296/96.21; 296/201
(58) Field of Classification Search ............ 296/187.04, 296/201, 192, 92.21
See application file for complete search history.

(56) References Cited

U.S. PATENT DOCUMENTS 6,193,305 B1 * 2/2001 Takahashi ................... 296/192

FOREIGN PATENT DOCUMENTS

| JP | 2000-038160 | 2/2000 |
|---|---|---|
| JP | 2004-155351 | 6/2004 |
| JP | 2004-217144 | 8/2004 |
| JP | 2006-007884 | 1/2006 |
| JP | 2006-205902 | 8/2006 |
| JP | 2006-240393 | 9/2006 |
| JP | 2006-264538 | 10/2006 |

* cited by examiner

*Primary Examiner*—Joseph D Pape
(74) *Attorney, Agent, or Firm*—Rankin, Hill & Clark LLP

(57) ABSTRACT

In a front windshield support structure of a vehicle, a windshield support 17 supports the lower end of a front windshield 18 in the upper portion of a reinforcing part 16 of a dashboard upper part 14. The windshield support 17 includes a front-side member 21 and a rear-side member 20 whose upper portions supporting the front windshield 18 are connected to each other and whose lower portions are connected to the dashboard upper part 14. The front-side member 21 is bent into a chevron shape in cross section such that a vertically intermediate part thereof projects forward. The rear-side member 20 is bent into a chevron shape in cross section such that a vertically intermediate part thereof projects rearward. Together, the front-side member 21 and the rear-side member 20 form a box-shaped cross section. When a collision load is inputted to the front windshield 18, the windshield support 17 is deformed and crushed such that vertically intermediate portions of the front-side member 20 and the rear-side member 21 are deformed so as to go away from each other, thereby minimizing a space which remains uncrushed to enhance the shock absorbing effect.

12 Claims, 6 Drawing Sheets

FRONT WINDSHIELD SUPPORT STRUCTURE OF A VEHICLE

BACKGROUND OF THE INVENTION

1. Field of the Invention

The present invention relates to a front windshield support structure of a vehicle, wherein a lower end of a front windshield is supported on an upper portion of a reinforcing part of a dashboard upper part via a windshield support.

2. Description of the Related Art

Japanese Patent Application Laid-open No. 2004-217144 discloses a cowl structure comprising a cowl 1 extending in the vehicle width direction along the upper edge of a dashboard panel 3 of an automobile. The cowl 1 is formed so as to have a box-shaped cross section having a bottom wall part 11 on the lower side, a vertical wall part 12 on the rear side, an upper wall part 13 on the upper side, and a plurality of shock absorbing members 2 on the front side. The upper wall part 13 supports the lower end of a front windshield 70. When a collision load acts on the front windshield 70, an easily deforming part 14 formed in the intermediate part of the vertical wall part 12 and the plurality of shock absorbing members 2 are vertically deformed and crushed to absorb the shock.

In the cowl structure described in Japanese Patent Application Laid-open No. 2004-217144, when a collision load acts on the front windshield 70, both the vertical wall part 12 and the shock absorbing members 2 are deformed forward and vertically crushed. Therefore, the crush amount is small and a sufficient shock absorbing effect cannot be achieved. Further, because the internal space of the cowl 1 is used as a gas-liquid separation part of an air conditioner, the size of the cowl 1 is increased, thereby disadvantageously reducing the degree of freedom in design.

SUMMARY OF THE INVENTION

In view of the foregoing, the present invention provides a front windshield support structure of a vehicle, which is compact, but can effectively absorb a collision load acting on a front windshield. According to the present invention, the lower end of a front windshield is supported on an upper portion of a reinforcing part of a dashboard upper part via a windshield support. The windshield support includes a front-side member and a rear-side member. Upper portions of the front-side member and the rear-side member, which are connected to each other, support the front windshield. The front-side member is bent such that an integral first slant wall and an integral second slant wall define a chevron shape in cross section with a vertically intermediate part thereof projecting forward. The rear-side member is bent such that an integral first slant wall and an integral second slant wall define a chevron shape in cross section with a vertically intermediate part thereof projecting rearward. The lower portions of the front-side member and the rear-side member are connected to dashboard upper part. Thus, the front-side member and the rear-side member form a box-shaped cross section. A gas-liquid separation chamber of an air conditioner can be formed above the dashboard upper part in front of the front-side member, and not between the front-side member and the rear-side member.

When a collision load is inputted to the front windshield, the windshield support is deformed and crushed such that vertically intermediate portions of the front-side member and the rear-side member are deformed so as to go away from each other, thereby minimizing a space which is remained uncrushed to enhance the shock absorbing effect. In addition, the size of the windshield support can be reduced as compared with the case where the gas-liquid separation chamber is formed between the front-side member and the rear-side member, thereby absorbing the shock with a compact construction.

The above-mentioned object, other objects, characteristics, and advantages of the present invention will become apparent from the preferred embodiment, which will be described in detail below by reference to the attached drawings.

DESCRIPTION OF THE PREFERRED EMBODIMENT

Figure 1:
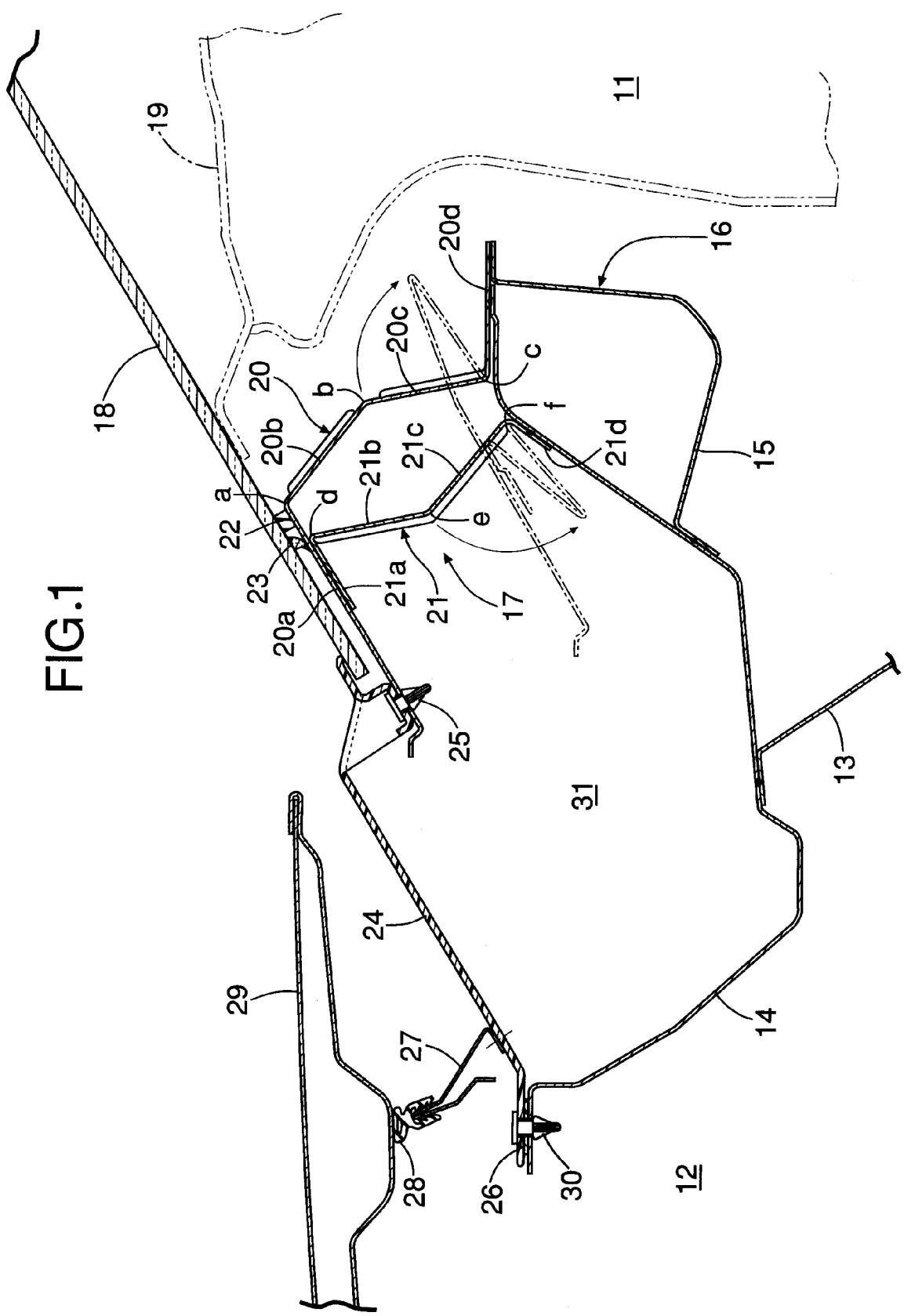
FIG. 1 is a longitudinal sectional view of a support part at a lower end of a front windshield.

As shown in FIG. 1, an open-upward trough-shaped dashboard upper part 14 is connected in its lower face to the upper end of a dashboard lower part 13 which is a partition between a vehicle compartment 11 and an engine room 12. A trough-shaped reinforcing beam 15 is connected to the lower surface of the rear portion of the dashboard upper part 14. The rear portion of the dashboard upper part 14 and the reinforcing beam 15 constitute a reinforcing part 16 having a box-shaped cross section. The lower end of a front windshield 18 is supported at a position above the reinforcing part 16 via a windshield support 17. A dashboard 19 covers the rear portions of the dashboard upper part 14, the windshield support 17, and the reinforcing beam 15.

The windshield support 17 comprises a rear-side member 20 positioned on the rear side and a front-side member 21 positioned on the front side. The lower end of the front windshield 18 is fixed via a dam rubber 22 and an adhesive 23 to the upper surface of an upper wall 20*a* of the rear-side member 20. The rear portion of a cowl cover 24 is fixed by clips 25 to the upper wall 20*a* of the rear-side member 20. The front portion of the cowl cover 24 is fixed by clips 30 to the front part of the dashboard upper part 14 via an ept seal 26. A weather strip 28 supported on the upper surface of the cowl cover 24 via a bracket 27 is in contact with the lower surface of a bonnet hood 29.

Figure 2:
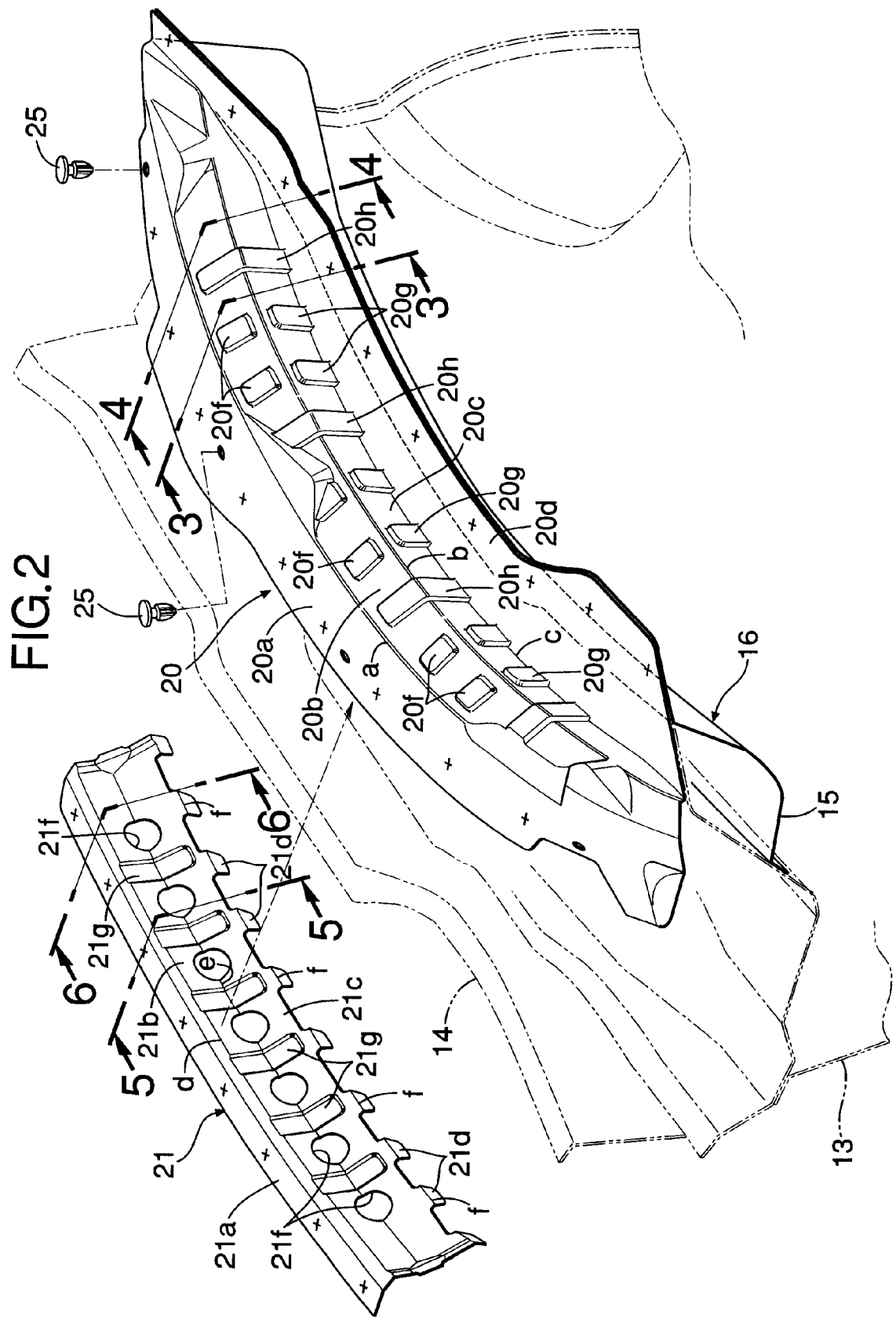
FIG. 2 is an exploded perspective view of a windshield support.
Figure 3:
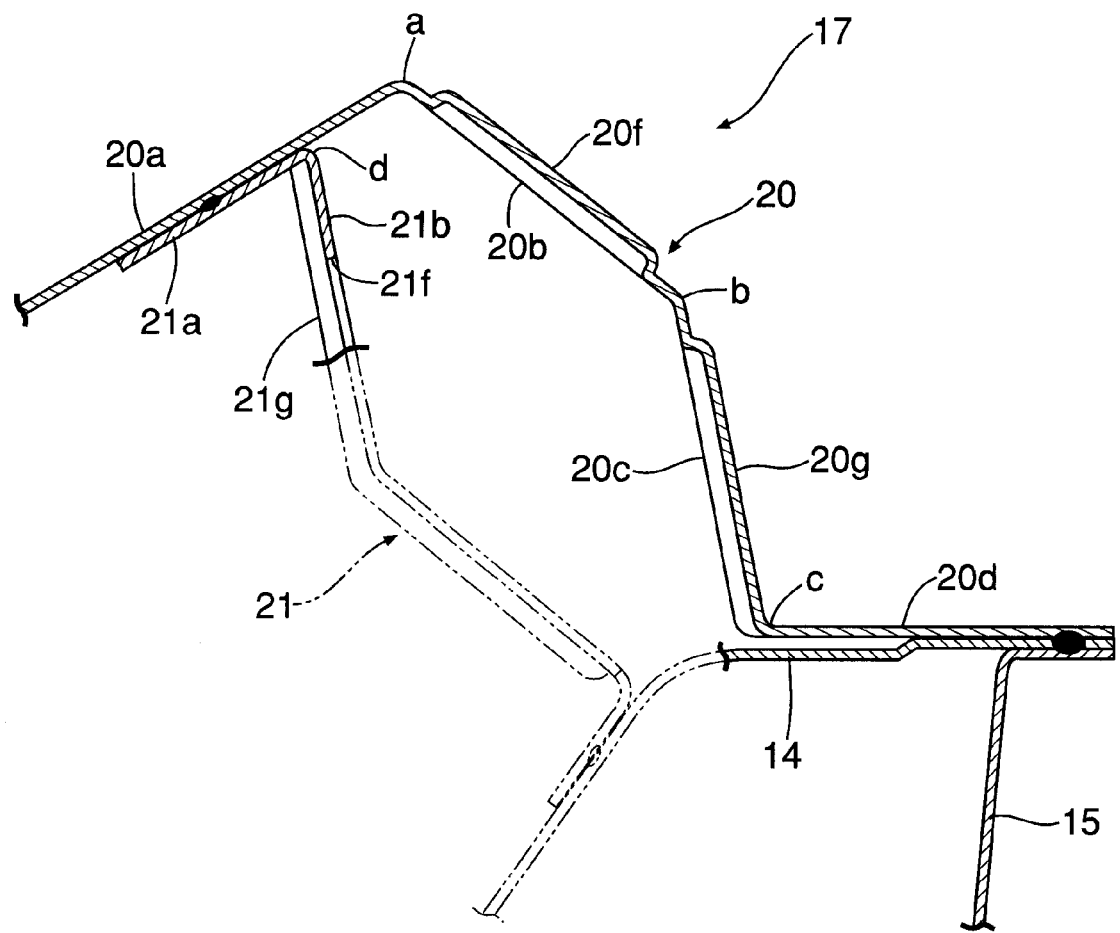
FIG. 3 is a sectional view taken along line 3-3 of FIG. 2.
Figure 4:
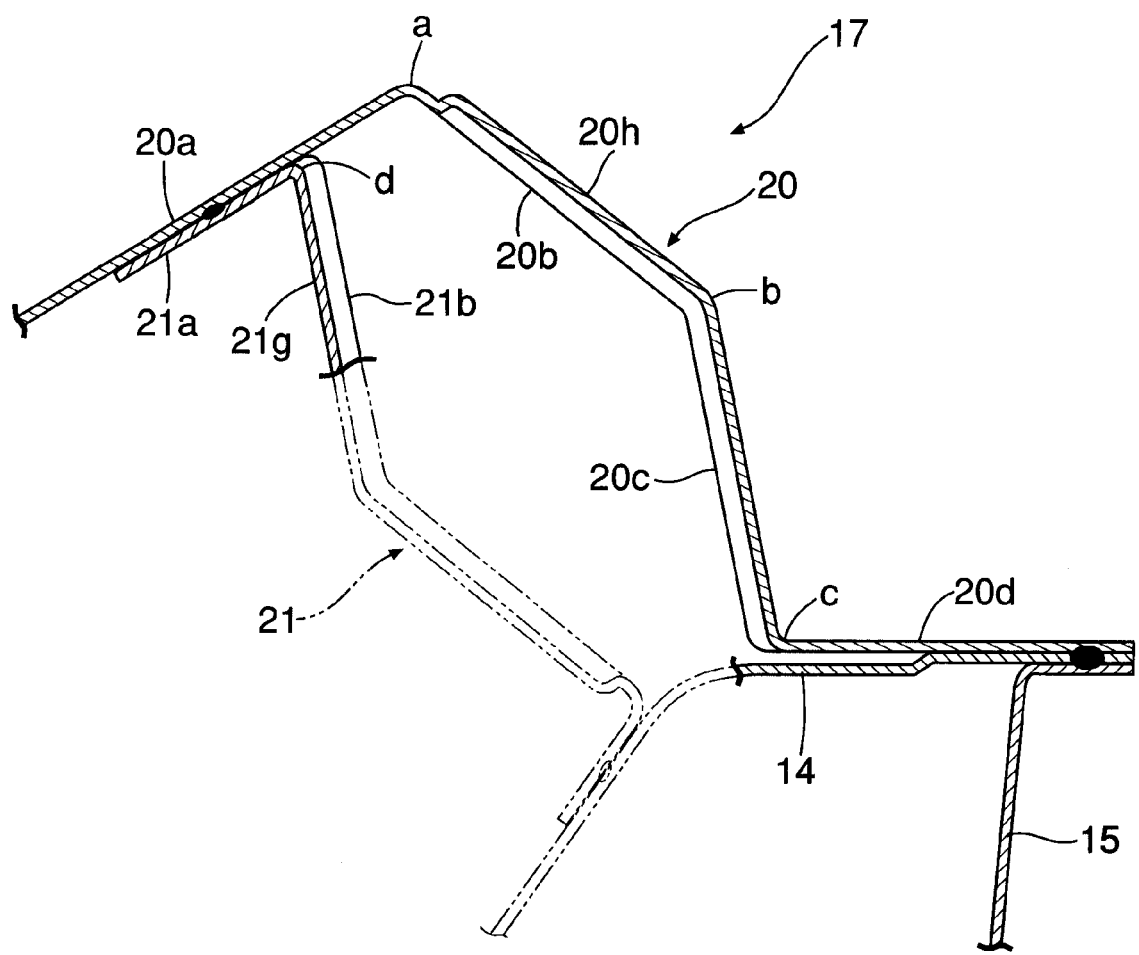
FIG. 4 is a sectional view taken along line 4-4 of FIG. 2.

As shown in FIGS. 2 to 4, the rear-side member 20 integrally includes a first slant wall 20*b*, a second slant wall 20*c*, and a lower wall 20*d*. The first slant wall 20*b* is connected to the rear end of the upper wall 20*a* via a fold line a. The second slant wall 20*c* is connected to the lower end of the first slant wall 20*b* via a fold line b. The lower wall 20*d* is connected to the lower end of the second slant wall 20*c* via a fold line c. The first slant wall 20*b* is provided with a plurality of beads 20*f*. The second slant wall 20*c* is provided with a plurality of beads 20*g*. A plurality of beads 20*h* are formed on the first and second slant walls 20*b* and 20*c* so as to extend over them.

Figure 5:
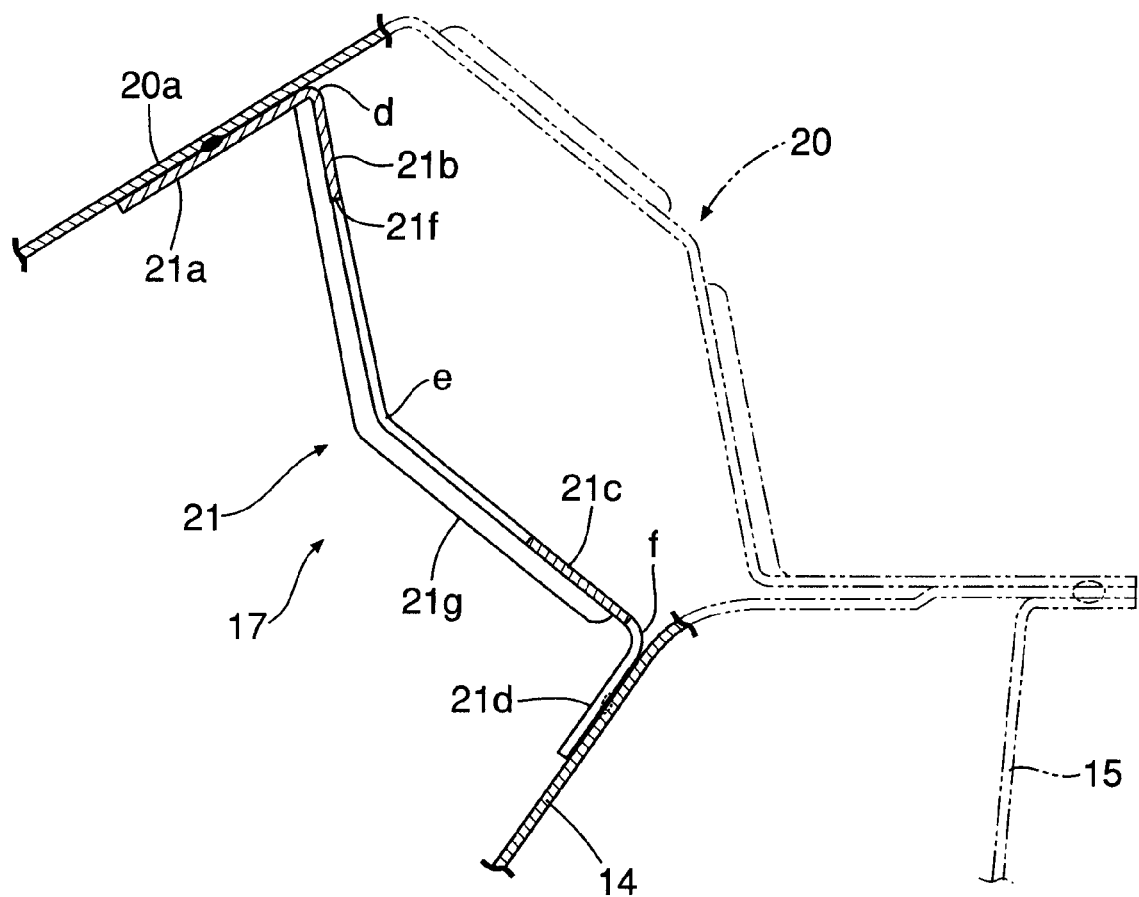
FIG. 5 is a sectional view taken along line 5-5 of FIG. 2.
Figure 6:
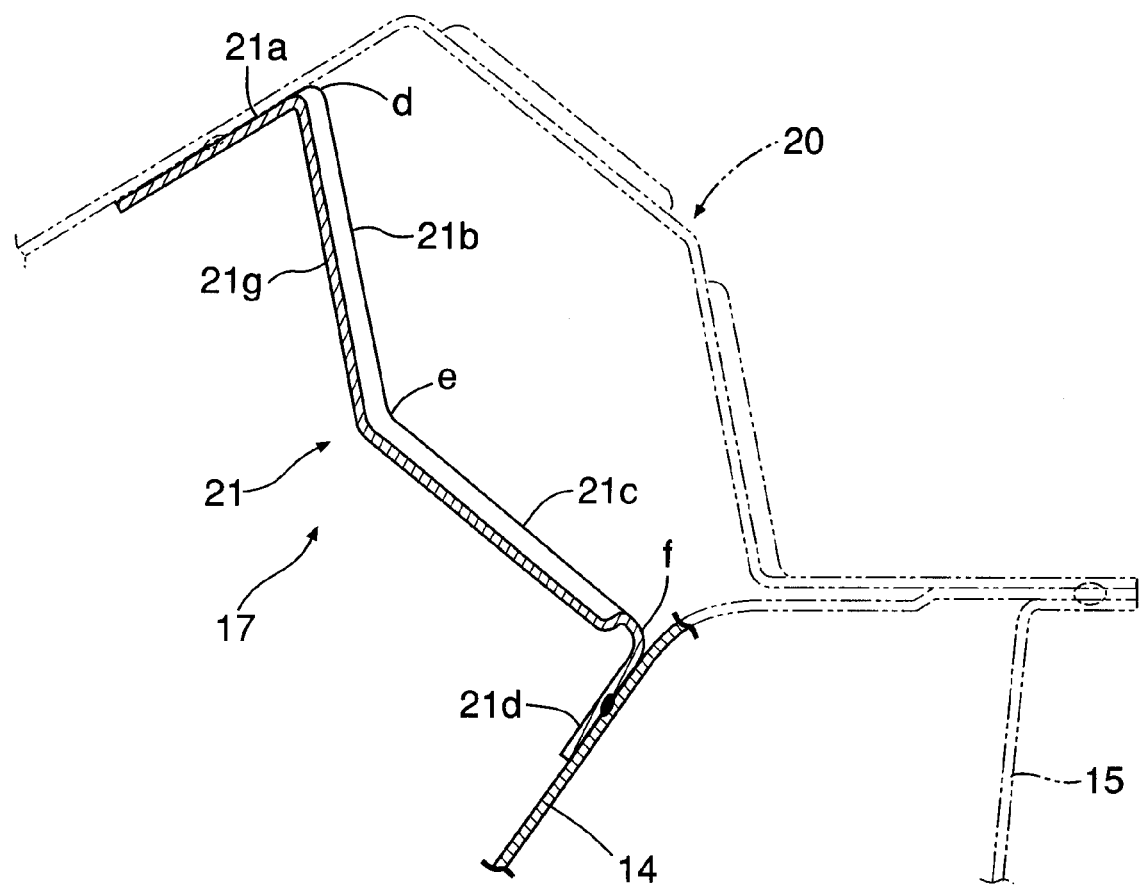
FIG. 6 is a sectional view taken along line 6-6 of FIG. 2.

As shown in FIGS. 2, 5 and 6, the front-side member 21 integrally includes an upper wall 21*a*, a first slant wall 21*b*, a second slant wall 21*c*, and a plurality of split lower walls 21*d*. The first slant wall 21*b* is connected to the rear end of the upper wall 21*a* via a fold line d. The second slant wall 21*c* is connected to the lower end of the first slant wall 21b via a fold line e. The lower walls 21d are connected to the lower end of the second slant wall 21c via a fold line f. A plurality of lightening holes 21f and a plurality of beads 21g are formed in the first and second slant walls 21b and 21c so as to extend over them.

The upper wall 20a of the rear-side member 20 and the upper wall 21a of the front-side member 21 are superposed and welded on each other. The lower wall 20d of the rear-side member 20 and the lower walls 21d of the front-side member 21 are welded to the upper surface of the dashboard upper part 14. The front and rear portions of the reinforcing beam 15 are welded to the lower surface of the dashboard upper part 14. In this state, as shown in FIG. 1, a gas-liquid separation chamber 31 of an air conditioner is defined between the dashboard upper part 14 and the cowl cover 24 at a position in front of the windshield support 17.

When an object is thrown up onto the bonnet hood 29 by a front bumper of the vehicle and collides with the front windshield 18, the windshield support 17 arranged between the reinforcing part 16 and the front windshield 18 is vertically crushed as indicated by the chain line in FIG. 1 to effectively absorb the shock, because the reinforcing part 16 having a high rigidity is difficult to be deformed. Specifically, when a vertical compressive force acts on the front windshield 18 which normally has a rhombic cross section, the first slant wall 20b and the second slant wall 20c of the rear-side member 20, which are bent into chevron shapes, are bent along the fold lines a, b and c with respect to the fixed upper wall 20a and lower wall 20d; and also the first slant wall 21b and the second slant wall 21c of the front-side member 21, which are bent into chevron shapes, are bent along the fold lines d, e and f with respect to the fixed upper wall 21a and lower walls 21d. Thus, the windshield support 17 is vertically crushed to absorb the shock. It will be appreciated that the first and second slant walls 20b and 20c of the rear-side member 20 can be reliably bent rearward along the fold line b, because the first and second slant walls 20b and 20c have an enhanced surface rigidity due to the beads 20f provided on the first slant wall 20b of the rear-side member 20 and the beads 20g provided on the second slant wall 20c of the rear-side member 20. Further, because the beads 20h are provided on the first and second slant walls 20b and 20c so as to extend over them, the surface rigidity of the first and second slant walls 20b and 20c is enhanced, and also buckling can be prevented at the time when the rear-side member 20 is press-molded.

Furthermore, because the lightening holes 21f are provided in the first slant wall 21b and the second slant wall 21c of the front-side member 21 so as to extend over them, the first and second slant walls 21b and 21c of the front-side member 21 can be reliably bent forward along the fold line e. In this structure, because the beads 21g are provided on the first and second slant walls 21b and 21c so as to extend over them, the surface rigidity of the first and second slant walls 21b and 21c is enhanced, and also buckling can be prevented at the time when the front-side member 21 is press-molded. Moreover, because the plurality of lower walls 21d are provided discretely on the front-side member 21, the front-side member 21 is reliably bent along the fold line f.

Thus, the first and second slant walls 20b and 20c of the rear-side member 20 and the first and second slant walls 21b and 21c of the front-side member 21, which are arranged into a rhombic shape, are crushed until these walls become substantially flat to eliminate a space therebetween, whereby the crush amount of the windshield support 17 is increased to maximize the shock absorbing effect. In addition, because the gas-liquid separation chamber 31 of the air conditioner is separated from the windshield support 17, and is formed between the dashboard upper part 14 and the cowl cover 24 in front of the windshield support 17, the cross-sectional area of the windshield support 17 can be reduced to a minimum value which is required for absorbing a shock, and the degree of freedom in design can be increased.

The embodiment of the present invention has been described above, but various changes in design may be made without departing from the subject matter of the present invention.

What is claimed is:

1. A front windshield support structure of a vehicle, comprising:
   a dashboard upper part including a reinforcing part, and a windshield support, the reinforcing part is defined to have a box-shaped cross section by a reinforcing beam being connected to the dashboard upper part; and
   a lower end of a front windshield being supported on an upper portion of the reinforcing part via the windshield support;
   wherein the windshield support includes a front-side member and a rear-side member whose upper portions supporting the front windshield are connected to each other and whose lower portions are connected to the upper portion of the reinforcing part,
   wherein the front-side member is bent into a chevron shape in cross section such that a vertically intermediate part thereof projects forward, the rear-side member is bent into a chevron shape in cross section such that a vertically intermediate part thereof projects rearward, and the front-side member and the rear-side member form a box-shaped cross section, and
   wherein when a vertical compressive force acts upon the windshield the vertically intermediate part of the front-side member and the vertically intermediate part of the rear-side member move in opposite directions such that the windshield support vertically collapses to a substantially flattened position to thereby absorb the shock from the compressive force.

2. The front windshield support structure of a vehicle according to claim 1, wherein a gas-liquid separation chamber of an air conditioner is formed above the dashboard upper part in front of the front-side member.

3. The front windshield support structure of a vehicle according to claim 1, further comprising a reinforcing beam that is connected to a lower surface of the rear portion of the reinforcing part.

4. The front windshield support structure of a vehicle according to claim 1, wherein the front side member integrally comprises an upper wall, a first slant wall, a second slant wall and a lower wall, and wherein the first slant wall and the second slant wall define the chevron shape of the front side member in cross section.

5. The front windshield support structure of a vehicle according to claim 4, wherein the front side member further comprises a plurality of beads disposed in the first slant wall.

6. The front windshield support structure of a vehicle according to claim 4, wherein the front side member further comprises a plurality of beads disposed in the second slant wall.

7. The front windshield support structure of a vehicle according to claim 4, wherein the front side member further comprises a plurality of beads disposed in both the first slant wall and the second slant wall so as to extend over both the first slant wall and the second slant wall.

8. The front windshield support structure of a vehicle according to claim 1, wherein the rear side member integrally comprises an upper wall, a first slant wall, a second slant wall and a lower wall, and wherein the first slant wall and the second slant wall define the chevron shape of the rear side member in cross section.

9. The front windshield support structure of a vehicle according to claim 8, wherein the front side member further comprises a plurality of beads disposed in the first slant wall.

10. The front windshield support structure of a vehicle according to claim 8, wherein the front side member further comprises a plurality of beads disposed in the second slant wall.

11. The front windshield support structure of a vehicle according to claim 8, wherein the front side member further comprises a plurality of beads disposed in both the first slant wall and the second slant wall so as to extend over both the first slant wall and the second slant wall.

12. A front windshield support structure of a vehicle, comprising:
 a dashboard upper part including a reinforcing part, and a windshield support, the reinforcing part being defined to have a box-shaped cross section by a reinforcing beam being connected to the dashboard upper part; and
 a lower end of a front windshield being supported on an upper portion of the reinforcing part via the windshield support;
wherein the windshield support includes a front-side member and a rear-side member whose upper portions supporting the front windshield are connected to each other and whose lower portions are directly connected to an upper portion of the reinforcing part; and
wherein the front-side member is bent into a chevron shape in cross section such that a vertically intermediate part thereof projects forward, the rear-side member is bent into a chevron shape in cross section such that a vertically intermediate part thereof projects rearward, and the front-side member and the rear-side member form a box-shaped cross section.

* * * * *